(12) United States Patent
Ban

(10) Patent No.: US 10,287,106 B2
(45) Date of Patent: May 14, 2019

(54) DISTRIBUTION METHOD AND DISTRIBUTION APPARATUS FOR DISTRIBUTING GLASS SUBSTRATES AND RELATED PROCESSING SYSTEM

(71) Applicant: Shenzhen China Star Optoelectronics Technology Co., Ltd., Shenzhen, Guangdong (CN)

(72) Inventor: Song Ban, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 227 days.

(21) Appl. No.: 15/107,344

(22) PCT Filed: May 26, 2016

(86) PCT No.: PCT/CN2016/083556
§ 371 (c)(1),
(2) Date: Jun. 22, 2016

(87) PCT Pub. No.: WO2017/161675
PCT Pub. Date: Sep. 28, 2017

(65) Prior Publication Data
US 2018/0099819 A1 Apr. 12, 2018

(30) Foreign Application Priority Data

Mar. 23, 2016 (CN) .......................... 2016 1 0168394

(51) Int. Cl.
*B65G 47/48* (2006.01)
*B65G 47/52* (2006.01)
(Continued)

(52) U.S. Cl.
CPC ........... *B65G 47/482* (2013.01); *B65G 37/02* (2013.01); *B65G 47/52* (2013.01); *B65G 49/061* (2013.01); *B65G 49/067* (2013.01)

(58) Field of Classification Search
CPC ...... B65G 47/482; B65G 47/52; B65G 37/02; B65G 49/061; B65G 49/067
(Continued)

(56) References Cited

U.S. PATENT DOCUMENTS 3,302,803 A * 2/1967 Mooney ............... B65G 47/843
198/471.1
3,860,125 A * 1/1975 Johnson ............... B65G 49/064
198/346.2
(Continued)

FOREIGN PATENT DOCUMENTS

CN 1531049 A 9/2004
CN 101193811 A 6/2008
(Continued)

*Primary Examiner* — Paul T Chin
(74) *Attorney, Agent, or Firm* — Andrew C. Cheng

(57) ABSTRACT

A method and an apparatus are provided for distributing glass substrates. The method includes: utilizing a first robot arm to pick up a first substrate and put the first substrate on a first conveyor belt; utilizing a second robot arm to pick up the first substrate and put the first substrate on a second production line; utilizing a third robot arm to pick up a second substrate and put the second substrate on a second conveyor belt; utilizing a fourth robot arm to pick up the second substrate and put the second substrate on a first production line. The first production line and the second production line are positioned side by side, and the first conveyor belt and the second conveyor belt are positioned between the first production line and the second production line. The method simplifies distribution and raises the efficiency.

11 Claims, 2 Drawing Sheets

(51) Int. Cl.
*B65G 49/06* (2006.01)
*B65G 37/02* (2006.01)

(58) Field of Classification Search
USPC .................................................. 294/213
See application file for complete search history.

(56) References Cited

U.S. PATENT DOCUMENTS

| | | | | |
|---|---|---|---|---|
| 3,946,626 | A * | 3/1976 | Koppa | A21C 15/00 |
| | | | | 83/105 |
| 4,406,230 | A | 9/1983 | Villemaud | |
| 5,887,699 | A * | 3/1999 | Tharpe | B07C 3/065 |
| | | | | 198/367 |
| 6,715,599 | B1 * | 4/2004 | Fortenbery | B65G 47/44 |
| | | | | 198/360 |
| 2010/0038837 | A1 * | 2/2010 | Demit | B23P 21/00 |
| | | | | 269/86 |
| 2011/0153082 | A1 * | 6/2011 | Franck | G01B 11/026 |
| | | | | 700/259 |
| 2012/0017538 | A1 * | 1/2012 | Ricco | A21C 9/045 |
| | | | | 53/240 |
| 2012/0029688 | A1 * | 2/2012 | Lager | G05B 19/41865 |
| | | | | 700/230 |
| 2012/0229620 | A1 * | 9/2012 | Ikeda | B25J 9/1697 |
| | | | | 348/94 |
| 2013/0186731 | A1 * | 7/2013 | Harres | B65G 47/52 |
| | | | | 198/370.01 |
| 2014/0147240 | A1 * | 5/2014 | Noda | B25J 9/0018 |
| | | | | 414/751.1 |
| 2014/0259613 | A1 * | 9/2014 | Shiota | B23P 21/006 |
| | | | | 29/428 |
| 2015/0020358 | A1 * | 1/2015 | Wu | B23K 26/083 |
| | | | | 29/407.01 |

FOREIGN PATENT DOCUMENTS

| | | |
|---|---|---|
| CN | 101607634 A | 12/2009 |
| CN | 102134003 A | 7/2011 |
| CN | 102290486 A | 12/2011 |
| CN | 202063557 U | 12/2011 |
| CN | 203127757 U | 8/2013 |
| CN | 203287648 U | 11/2013 |
| CN | 104037177 A | 9/2014 |
| CN | 104176509 A | 12/2014 |
| JP | 8-34234 B2 | 3/1996 |
| JP | 10-95542 A | 4/1998 |
| WO | 0068118 A1 | 11/2000 |

* cited by examiner

DISTRIBUTION METHOD AND DISTRIBUTION APPARATUS FOR DISTRIBUTING GLASS SUBSTRATES AND RELATED PROCESSING SYSTEM

CROSS REFERENCE

This application claims the benefit and priority of Chinese Application No. 201610168394.0, entitled "Distribution Method and Distribution Apparatus for Distributing Glass Substrates and Related Processing System", filed on Mar. 23, 2016, the disclosure of which is incorporated herein by reference in its entirety.

FIELD OF THE INVENTION

The invention relates to a distribution method and a distribution system, and more particularly, to a distribution method and a distribution system for distributing glass substrates.

BACKGROUND OF THE INVENTION

In the related art, when the multi-model glass (MMG) products are being manufactured, a single glass substrate may be cut into two glass substrates of different sizes. One of the two glass substrates is distributed to the next stop and the other of the two glass substrates is distributed to another production line to process.

However, a conventional distribution method utilizes a robot arm to move the glass substrates and utilizes two stacked conveyor belts to distribute the glass substrates. However, this distribution mechanism is complicated, inefficient, and more expensive. Furthermore, the space under the stacked conveyor belts is often utilized as a flow channel, which means that operators are allowed to move under the stacked conveyor belts. However, the space (height) under the stacked conveyor belts is smaller due to the thickness of the stacked conveyor belts and thus operators cannot move very smoothly.

SUMMARY OF THE INVENTION

It is therefore one of the primary objectives of the claimed invention to provide a distribution method for distributing glass substrates, to simplify the distributing mechanism and raise the efficiency.

According to an exemplary embodiment of the claimed invention, a distribution method for distributing glass substrates is disclosed. The distribution method comprises: utilizing a first robot arm to pick up a first substrate and put the first substrate on a first conveyor belt; utilizing a second robot arm to pick up the first substrate and put the first substrate on a second production line; utilizing a third robot arm to pick up a second substrate and put the second substrate on a second conveyor belt; utilizing a fourth robot arm to pick up the second substrate and put the second substrate on a first production line, wherein the first production line and the second production line are positioned side by side, and the first conveyor belt and the second conveyor belt are positioned between the first production line and the second production line.

Furthermore, a logistics corridor is positioned between a ground and the first and the second conveyor belts.

Furthermore, the first and the second robot arms grab a holder attached to the first substrate to pick up the first substrate and the third and the fourth robot arms grab a holder attached to the second substrate to pick up the second substrate.

According to an exemplary embodiment of the claimed invention, a distribution apparatus for distributing a first substrate and a second substrate to a first production line and a second production line is disclosed. The distribution apparatus comprises: one or more conveyor belts, connected between the first production line and the second production line; one or more robot arms, configured to pick up the first substrate and the second substrate to distribute the first substrate and the second substrate; wherein the first production line and the second production line are positioned side by side, and the distribution apparatus is positioned between the first production line and the second production line.

Furthermore, the distribution apparatus comprises a first conveyor belt and a second conveyor belt, which are parallel-positioned, and the distribution apparatus comprises a first robot arm, a second robot arm, a third robot arm, and a fourth robot arm, wherein the first robot arm and the second robot arm are positioned at different sides of the first conveyor belt and the third robot arm and the fourth robot arm are positioned at different sides of the second conveyor belt.

Furthermore, a logistics corridor is positioned between a ground and the first and the second conveyor belts.

Furthermore, the first and the second robot arms grab a holder attached to the first substrate to pick up the first substrate and the third and the fourth robot arms grab a holder attached to the second substrate to pick up the second substrate.

According to an exemplary embodiment of the claimed invention, a processing system comprising the above-mentioned distribution apparatus is disclosed.

In contrast to the related art, the distribution apparatus has robot arms positioned at different sides of the conveyor belts, which can be used to pick up or put down the substrates. This simplifies the distribution and shortens the processing time per unit. In addition, it also simplifies the entire structure and reduces the price of the distribution apparatus.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. Specifically, the terminologies in the embodiments of the present invention are merely for describing the purpose of the certain embodiment, but not to limit the invention.

Figure 1:
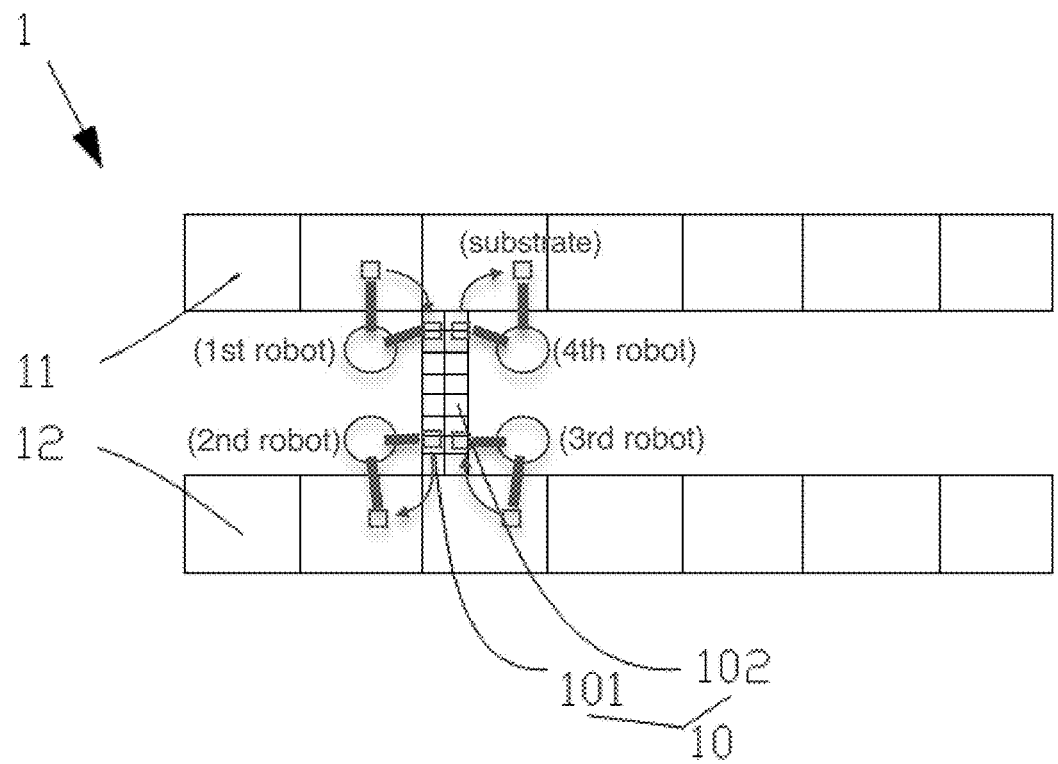
FIG. 1 is a diagram depicting a plan view of a processing system having a distribution apparatus for distributing glass substrates according to an exemplary embodiment.

Please refer to FIG. 1, which is a diagram depicting a plan view of a processing system 1 having a distribution apparatus 10 for distributing glass substrates according to an exemplary embodiment. The processing system 1 comprises a first production line 11 and a second production line 12. As shown in FIG. 1, a glass substrate (not shown) is cut into a first substrate and a second substrate. The first substrate and the second substrate are distributed by the distribution apparatus 10 and thus respectively transferred on the first production line 11 and the second production line 12. The first production line 11 and the second production line 12 are positioned side by side. The distribution apparatus is positioned between the first production line 11 and the second production line 12. The distribution apparatus 10 comprises the first conveyor belt 101 and a second conveyor belt 102 and robot arms. The first conveyor belt 101 and a second conveyor belt 102 are parallel-positioned. The number of the robot arms is four, where the first robot arm and the second robot arm are positioned at different sides of the first conveyor belt 101, and the third robot arm and the fourth robot arm are positioned at different sides of the second conveyor belt 102.

In the distribution process, the first robot arm pick up the first substrate from the first production line 11 and put the first substrate on the first conveyor belt 101. The second robot arm pick up the first substrate from the first conveyor belt 101 and put the first substrate on the second production line 12. The third robot arm pick up the second substrate from the second production line 12 and put the second substrate on the second conveyor belt 102. The fourth robot arm pick up the second substrate from the second conveyor belt 102 and put the second substrate on the first production line 11. Please note that the first robot arm, the second robot arm, the third robot arm, and the fourth robot arm can simultaneously operate to pick up/put down the substrates. In contrast to the related art, the robot arms only have picking-up/putting down operations and thus the movement of the robot arms are simple. It raises the efficiency and also simplifies the structure and reduces the costs of the distribution apparatus.

Figure 2:
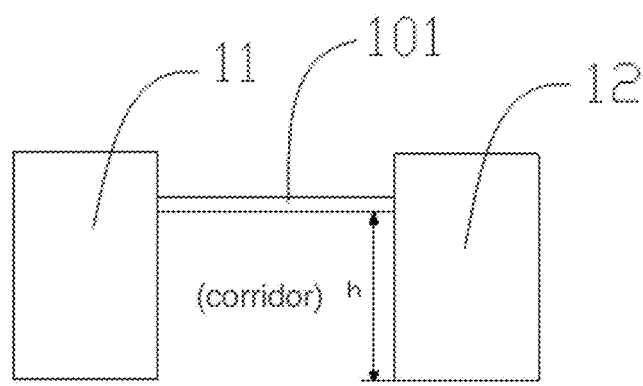
FIG. 2 is a diagram depicting a side view of the processing system shown in FIG. 1.

Please refer to FIG. 2, which is a diagram depicting a side view of the processing system 1 shown in FIG. 1. As shown in FIG. 2, a logistics corridor is positioned between a ground and the first conveyor belt 101 and the second conveyor belt 102. Because the first production line 11 and the second production line 12 are positioned side by side, the logistics corridor under the first conveyor belt 101 and the second conveyor belt 102 can secure enough space (the height can be 1.9 meters). It ensures the products or operators to move smoothly.

In an exemplary embodiment, the first and the second robot arms grab a holder attached to the first substrate to pick up the first substrate and put the first substrate on a certain position and the third and the fourth robot arms grab a holder attached to the second substrate to pick up the second substrate and put the second substrate on a certain position. The holder utilizes the atmospheric pressure to be attached to the first substrate or the second substrate. In contrast to other structures, the holder is not expensive, has simple structure, and is easy to use.

Figure 3:
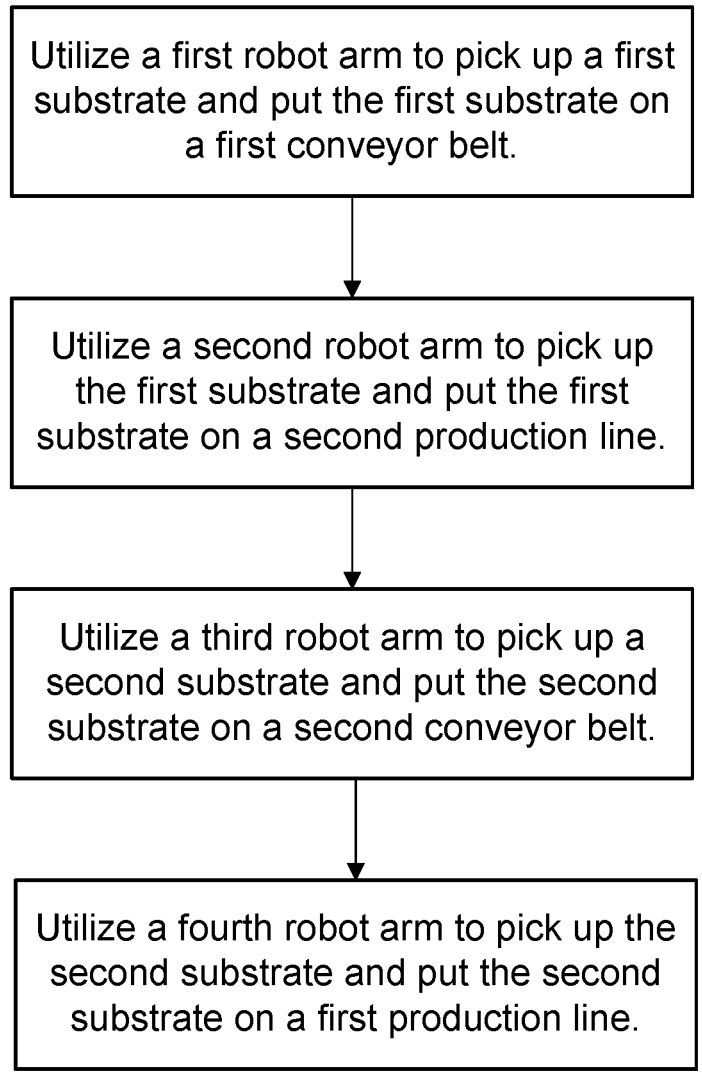
FIG. 3 is a flow chart showing a distribution method for distributing glass substrates according to an exemplary embodiment.

Please refer to FIG. 3, which is a flow chart showing a distribution method for distributing glass substrates according to an exemplary embodiment. First, a first robot arm is utilized to pick up the first substrate from the first production line and put the first substrate on the first conveyor belt. In addition, a second robot arm is utilized to pick up the first substrate from the first conveyor belt and put the first substrate on the second production line. Furthermore, the third robot arm is utilized to pick up the second substrate from the second production line and put the second substrate on the second conveyor belt. Moreover, the fourth robot arm is utilized to pick up the second substrate from the second conveyor belt and put the second substrate on the first production line. The first production line and the second production line are positioned side by side. The first conveyor belt and the second conveyor belt are parallel positioned and positioned between the first production line and the second production line. In addition, please note that the above-mentioned steps could be performed at the same time.

In contrast to the related art, the distribution apparatus according to an exemplary embodiment has a simplified distribution method. The robots arms only have picking-up/putting down operations and thus the movement of the robot arms are simple. It raises the efficiency and also simplifies the structure and reduces the costs of the distribution apparatus.

Above are embodiments of the present invention, which does not limit the scope of the present invention. Any modifications, equivalent replacements or improvements within the spirit and principles of the embodiment described above should be covered by the protected scope of the invention.

What is claimed is:

1. A method for distributing glass substrates, comprises:
utilizing a first robot arm to pick up a first substrate and put the first substrate on a first conveyor belt;
utilizing a second robot arm to pick up the first substrate and put the first substrate on a second production line;
utilizing a third robot arm to pick up a second substrate and put the second substrate on a second conveyor belt;
utilizing a fourth robot arm to pick up the second substrate and put the second substrate on a first production line,
wherein the first production line and the second production line are positioned side by side, and the first conveyor belt and the second conveyor belt are positioned between the first production line and the second production line.

2. The distribution method according to claim 1, wherein a logistics corridor is positioned between a ground and the first and the second conveyor belts.

3. The distribution method according to claim 2, wherein the first and the second robot arms grab a holder attached to the first substrate to pick up the first substrate and the third and the fourth robot arms grab a holder attached to the second substrate to pick up the second substrate.

4. A distribution apparatus for distributing a first substrate and a second substrate, which are cut from a single glass substrate, to a first production line and a second production line, the distribution apparatus comprising:
conveyor belts, connected between the first production line and the second production line;
robot arms, configured to pick up the first substrate and the second substrate to distribute the first substrate and the second substrate;
wherein the first production line and the second production line are positioned side by side, and the distribution apparatus is positioned between the first production line and the second production line to transfer the first substrate and the second substrate between the first production line and the second production line.

5. The distribution apparatus according to claim 4, wherein the distribution apparatus comprises a first conveyor belt and a second conveyor belt, which are parallel-positioned and arranged between the first and second production lines, and the robot arms of the distribution apparatus comprise a first robot arm, a second robot arm, a third robot arm, and a fourth robot arm, wherein the first robot arm and the second robot arm are positioned at different sites along the first conveyor belt to allow the first robot arm to pick up the first substrate from the first production line and place the first substrate on the first conveyor belt and to allow the second robot arm to pick up the first substrate from the first conveyor belt and place the first substrate on the second production line; and the third robot arm and the fourth robot arm are positioned at different sites along the second conveyor belt to allow the third robot arm to pick up the second substrate from the second production line and place the second substrate on the second conveyor belt and to allow the fourth robot arm to pick up the second substrate from the second conveyor belt and place the second substrate on the first production line.

6. The distribution apparatus according to claim 5, wherein the first and second conveyor belts are arranged above a ground surface and a logistics corridor is formed between the ground surface and the first and the second conveyor belts.

7. The distribution method according to claim 6, wherein the first and the second robot arms are individually attachable to the first substrate to pick up the first substrate and the third and the fourth robot arms are individually attachable to the second substrate to pick up the second substrate.

8. A processing system for processing a glass substrate to be cut to a first substrate and a second substrate, the processing system comprising a distribution apparatus, the distribution apparatus comprising:
conveyor belts, connected between the first production line and the second production line;
robot arms, configured to pick up the first substrate and the second substrate to distribute the first substrate and the second substrate;
wherein the first production line and the second production line are positioned side by side, and the distribution apparatus is positioned between the first production line and the second production line to transfer the first substrate and the second substrate between the first production line and the second production line.

9. The processing system according to claim 8, wherein the distribution apparatus comprises a first conveyor belt and a second conveyor belt, which are parallel-positioned and arranged between the first and second production lines, and the robot arms of the distribution apparatus comprise a first robot arm, a second robot arm, a third robot arm, and a fourth robot arm, wherein the first robot arm and the second robot arm are positioned at different sites of the first conveyor belt to allow the first robot arm to pick up the first substrate from the first production line and place the first substrate on the first conveyor belt and to allow the second robot arm to pick up the first substrate from the first conveyor belt and place the first substrate on the second production line; and the third robot arm and the fourth robot arm are positioned at different sites of the second conveyor belt to allow the third robot arm to pick up the second substrate from the second production line and place the second substrate on the second conveyor belt and to allow the fourth robot arm to pick up the second substrate from the second conveyor belt and place the second substrate on the first production line.

10. The processing system according to claim 9, wherein the first and second conveyor belts are arranged above a ground surface and a logistics corridor is formed between the ground surface and the first and the second conveyor belts.

11. The processing system according to claim 10, wherein the first and the second robot arms are individually attachable to the first substrate to pick up the first substrate and the third and the fourth robot arms are individually attachable to the second substrate to pick up the second substrate.

\* \* \* \* \*